No. 677,771. Patented July 2, 1901.
E. T. BIRDSALL.
MEANS FOR CONNECTING DIFFERENTIAL GEARING TO DRIVING AXLES OF VEHICLES.
(Application filed Oct. 5, 1900.)
(No Model.)
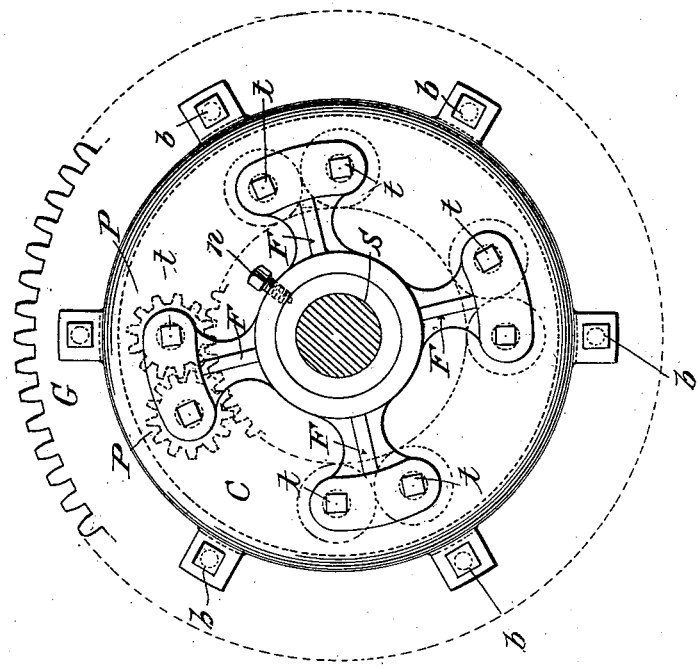
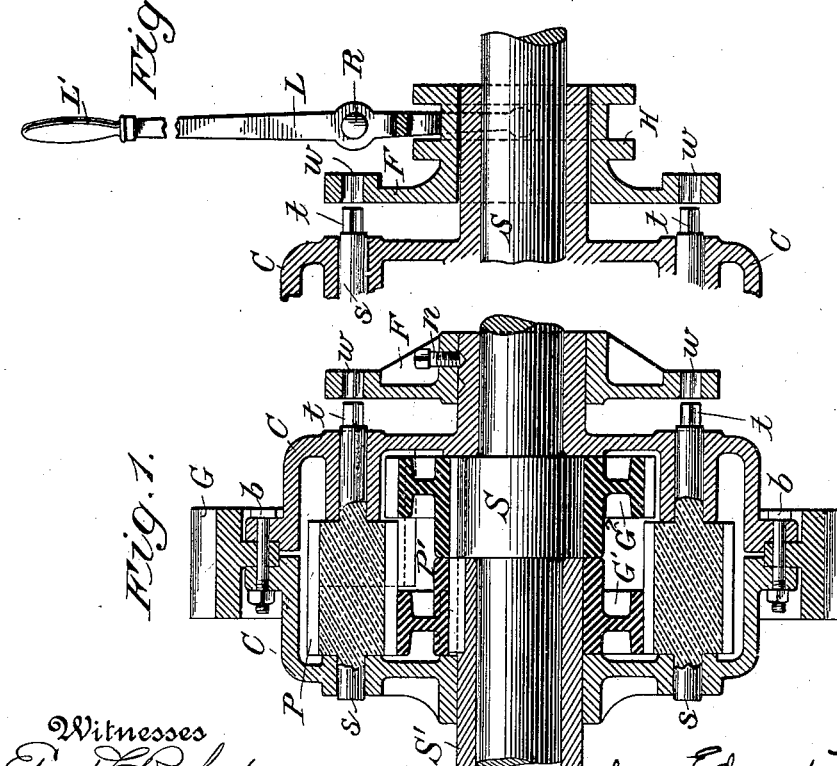
Witnesses
Edward E. Rowland
M. F. Keating
Inventor
Edward T. Birdsall
By his Attorney
Charles J. Kintner

UNITED STATES PATENT OFFICE.

EDWARD T. BIRDSALL, OF NEW ROCHELLE, NEW YORK, ASSIGNOR TO DESBERON MOTOR-CAR CO., OF SAME PLACE.

MEANS FOR CONNECTING DIFFERENTIAL GEARING TO DRIVING-AXLES OF VEHICLES.

SPECIFICATION forming part of Letters Patent No. 677,771, dated July 2, 1901.

Application filed October 5, 1900. Serial No. 32,077. (No model.)

*To all whom it may concern:*

Be it known that I, EDWARD T. BIRDSALL, a citizen of the United States, residing at New Rochelle, in the county of Westchester and State of New York, have invented a new and useful Invention in Means for Connecting Differential Gearing to the Driving-Axles of Vehicles, of which the following is a specification.

My invention has for its object to provide means whereby differential gearing, such as is well known and in general public use and applicable to the axles of vehicles for the purpose of enabling the driving power to be applied thereto under all conditions of usage, may be positively and rigidly secured to both driving-wheels, so that when the united tractive action of said wheels is required the same may be effected in such manner that the strains put upon the differential gearing may be equally distributed to all of the parts thereof and with as little inconvenience as possible, and will be fully understood by referring to the accompanying drawings, in which—

Figure 1 is a sectional view taken through the body of a well-known type of differential gearing and my novel means of connecting the same to the axle of a vehicle, said axle and the journals of two of the pinions of the gearing being shown in elevational view. Fig. 2 is a side elevational view as seen looking at Fig. 1 from right to left. Fig. 3 is a part-sectional part-elevational detail view illustrating a modified means for applying my novel connection.

Referring now to the drawings in detail, in all of which like letters of reference represent like or equivalent parts wherever used, S represents the shaft of a vehicle, to one of the ends of which is secured one of the driving or traction wheels, and S' is a sleeve surrounding the same, the other driving or traction wheel being secured thereto in the usual manner, said driving-wheels not being shown in the drawings.

C C represent the two-part casing of a well-known type of differential gearing, one of said parts having a bearing upon the shaft S and the other upon the sleeve S', said casing inclosing the differential gearing, consisting of the gear-wheels $G'$ $G^2$ and pairs of pinions P P P' P', meshing on opposite sides, respectively, with the gear-wheels $G'$ $G^2$ in a manner well understood, said pinions being journaled, as shown at $s\ s$, in the two-part casing C C.

G represents the main driving or traction gear-wheel, secured by radial lugs or ears and bolts $b\ b\ b$ around the outer face of the casing C C.

The structure so far described is well known in the art and well understood by those versed in the application of differential gearing to traction-vehicles and needs no further description here.

My improvement consists in providing means for so interconnecting this differential gearing with the shaft S and sleeve S' that all of the parts may be moved together when desired as one integral shaft, and this I effect by prolonging or extending the shafts $s\ s$ of the pairs of pinions P P P' P' on one side, as shown in Figs. 1 and 3, a definite distance beyond the face of the casing C and giving to said ends a rectangular shape, as shown at $t$.

F represents a cast-metal spider having a hollow cylindrical body adapted to slide over the cylindrical extension of one portion of the casing C, which extension is provided with two conical or similar seats for the purpose of receiving the inner end of a set-screw $n$. (See Fig. 1.) It is the function of this set-screw $n$ and the two conical seats to permanently lock or hold the spider in either of two positions. In the outer ends of the arms of the spider F are pairs of rectangular-shaped holes $w\ w$ of slightly-greater cross-sectional area than the rectangular ends $t\ t$ of the pairs of shafts $s\ s$. When it is desired to connect all of the parts together, so as to move as one integral mass, the set-screw $n$ is withdrawn from the position shown in Fig. 1 and the spider moved inward, so that the rectangular-shaped ends $t\ t$ pass into the corresponding pairs of rectangular-shaped openings $w\ w$ in the ends of the arms thereof, after which the set-screw is seated in the inner conical seat. It will be understood, therefore, after this connection is effected that when the gear-wheel G is rotated by the source of driving power the casing C C, and hence the differential gearing, will all be interlocked and held together as one integral mass.

In Fig. 3 I have shown a modified means for locking or holding the interconnecting differential gearing with relation to the shaft of a vehicle, the spider F, the rectangular-shaped openings $w\,w$, and the rectangular-shaped ends $t\,t$ of the pinion-shafts $s\,s$ being the same as is illustrated in Fig. 1. In place of the set-screw $n$, however, I arrange a spline between the sleeve and the spider, so that said spider may partake of a longitudinal movement upon the sleeve. H is an annular head cast integral with the spider and having a groove in its outer face adapted to receive the forked ends of a lever L, pivoted at R and adapted to be operated by an operating-handle L' in the manner of pulley-shifting devices well known in the arts. The operation of this modified form is obvious, it being apparent that when it is desired to interconnect all of the parts it is only necessary for the operator to move the operating-handle L' to the right, when the parts will be secured together, the rectangular-shaped ends $t$ passing into the corresponding rectangular openings $w\,w$ in the ends of the arms of the spider F. Such an arrangement enables the user to quickly and easily effect the connection or disconnection, as desired, from the driving-seat of the vehicle.

I do not limit my invention to the specific structure herein shown and described, as I believe I am broadly entitled to claim means whereby all of the individual shafting of the pinions of a differential gear like that herein disclosed may be readily interconnected with a two-part driving-shaft, one of which has a surrounding sleeve, together with means for locking or holding the same in either of two positions and in such manner that the strains are equally distributed to all parts of the differential gearing and not wholly upon any individual part thereof, the arrangement being such that the two-part driving-shaft may be driven as a unit or independently; nor do I limit myself to the use of any particular number of pairs of differential pinions P P P' P', as it is obvious that the essential principle of my invention may be effected by connecting the individual shafts of one pair of such pinions in the manner hereinbefore described.

Having thus described my invention, what I claim, and desire to secure by Letters Patent of the United States, is—

1. A two-part driving-shaft in combination with differential gearing carried thereby and means for interconnecting said shaft and gearing in such manner that the strains shall be equally distributed to all parts of the gearing and both parts of the shaft, together with means for locking or holding the same in either of two positions so that the driving-shaft may be driven as a unit or independently, substantially as described.

2. A two-part driving-shaft in combination with differential gearing carried thereby, and a spider provided with means for interconnecting all of said parts in such manner that the strains shall be distributed equally to all parts of the gearing and both parts of the shaft, together with means for locking or holding the same in either of two positions so that the driving-shaft may be driven as a unit or independently, substantially as described.

3. A two-part driving-shaft in combination with differential gearing carried thereby and a spider provided with means for connecting it to the shafting of all of the pinions of the differential gearing and in such manner as to interconnect all of the parts together, together with means for locking or holding the same in either of two positions so that the driving-shaft may be driven as a unit or independently, substantially as described.

4. A two-part driving-shaft, differential gearing comprising gear-wheels and pinions carried thereby and connected thereto; in combination with a spider having longitudinal movement on one part of the shaft, said spider being provided with rectangular-shaped openings adapted to receive the rectangular-shaped ends of the shafts of the pinions, substantially as described.

In testimony whereof I have signed my name to this specification in the presence of two subscribing witnesses.

EDWARD T. BIRDSALL.

Witnesses:
C. J. KINTNER,
M. F. KEATING.